(12) United States Patent
Bowman et al.

(10) Patent No.: US 6,887,030 B2
(45) Date of Patent: May 3, 2005

(54) APPARATUS FOR RESISTING ROTATION OF CAN ENDS IN A DOWNSTACKER AND METHOD REGARDING SAME

(75) Inventors: Kenneth A. Bowman, Apollo, PA (US); Daniel B. Bergstrom, Sarver, PA (US); Richard R. Mathabel, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 298 days.

(21) Appl. No.: 10/212,328

(22) Filed: Aug. 6, 2002

(65) Prior Publication Data

US 2004/0028518 A1 Feb. 12, 2004

(51) Int. Cl.[7] .............................................. B65G 59/10
(52) U.S. Cl. ........................ 414/795.6; 413/35; 414/801
(58) Field of Search .................... 406/83, 87, 157–163, 406/191–196; 413/35, 45, 47–51; 414/795.6, 797.4, 797.6, 797.7, 797.8, 798.1, 801

(56) References Cited

U.S. PATENT DOCUMENTS

| | | | |
|---|---|---|---|
| 3,618,550 A | * | 11/1971 | Mojden et al. ............... 413/47 |
| 3,930,557 A | * | 1/1976 | Schnell et al. .............. 181/200 |
| 3,999,495 A | * | 12/1976 | Rouse et al. ................... 413/49 |
| 4,262,629 A | | 4/1981 | McConnellogue et al. .. 118/668 |
| 4,723,882 A | | 2/1988 | Wissman et al. ............. 413/66 |
| 4,775,274 A | * | 10/1988 | Ono et al. ..................... 413/66 |
| 4,799,846 A | | 1/1989 | Wissman et al. ............. 413/66 |
| 4,846,774 A | * | 7/1989 | Bell ............................. 493/87 |
| 5,335,810 A | * | 8/1994 | Holloway ..................... 221/10 |
| 5,476,362 A | | 12/1995 | Kobak et al. ............. 414/797.7 |
| 5,494,399 A | | 2/1996 | Pearce ..................... 414/788.4 |
| 5,653,576 A | | 8/1997 | Pearce ..................... 414/797.7 |
| 5,876,171 A | | 3/1999 | Martin et al. ................. 413/14 |
| 6,035,672 A | * | 3/2000 | Lai ............................... 70/25 |

* cited by examiner

Primary Examiner—Janice L. Krizek
(74) Attorney, Agent, or Firm—David P. Maivald; Eckert Seamans Cherin & Mellott, LLC

(57) ABSTRACT

An apparatus for resisting rotational movement of can ends in a downstacker is provided, that includes a housing having a bore, a ring having a bore that is disposed within the housing, a second ring having a bore that is disposed within the housing and a sleeve having a bore that is disposed within the housing wherein the bores of the ring, the second ring and the sleeve are in substantial alignment relative to each other. A method of resisting the rotational movement of can ends in a downstacker is also provided.

19 Claims, 4 Drawing Sheets

APPARATUS FOR RESISTING ROTATION OF CAN ENDS IN A DOWNSTACKER AND METHOD REGARDING SAME

FIELD OF THE INVENTION

This invention relates to an apparatus for handling can ends, and more particularly relates to an insert that restricts the rotation of can ends in a downstacker.

BACKGROUND OF THE INVENTION

The present invention is concerned with the handling of can ends in a downstacker that restricts the rotation of the can ends in a downstacker that feeds can ends into a compound liner apparatus, a conversion press, an end seaming apparatus or offline test equipment for further processing. Can ends can be lids in a two piece can, lids and bottoms in a three piece can or bottoms of a two piece can with a screw cap on the other end. Typically, can ends are supplied in sticks consisting of a stack of can ends that are placed in a downstacker and are individually fed from the bottom of the downstacker onto a starwheel of the compound liner apparatus, conversion press, end seaming apparatus or offline test equipment for further processing. An example of a downstacker that contains a stack of can ends can be seen in U.S. Pat. No. 5,476,362.

A continuing problem that can be encountered in the handling of can ends in a downstacker is that rotational movement of the feed screws in the compound liner apparatus, conversion press, end seaming apparatus or offline test equipment can cause the can ends in the downstacker to rotate. Rotational movement of the can ends relative to each other can cause abrasion on the surface of the can ends. Abrasion of the can ends could lead to the build up of wear debris from the abraded can end that could contaminate the contents of a beverage or food container and lead to the accumulation of wear debris in the compound liner apparatus, conversion press, end seaming apparatus or offline test equipment. The accumulated debris in these machines must eventually be removed in a time consuming cleansing operation of the machinery that would cause production line down time. Additionally, abraded or scratched can ends are not aesthetically pleasing to an end user customer purchasing a beverage or food container because end user customers expect a beverage or food container to not be damaged. Abraded or scratched can ends are particularly unattractive in the case of colored ends. Thus, a need exists in the art to provide an apparatus that restricts the rotation of can ends in a downstacker.

SUMMARY OF THE INVENTION

It is an object of the invention to provide an apparatus that provides resistance to the rotational movement of can ends in a downstacker.

It is another object of the invention to provide a method for resisting the rotational movement of can ends in a downstacker.

Certain objects of the invention are achieved by providing an apparatus for resisting rotational movement of can ends in a downstacker that provides a housing having a bore with a flange at one end of the housing and a step at a second end of the housing. Also, a ring having a bore is provided that is disposed within the housing, the ring having a one end and a second end, the second end of the ring located by the step of the housing. Additionally, a second ring having a bore is provided that is disposed within the housing, the second ring having a one end and a second end, either the one end or the second end of the second ring is located by the one end of the ring. Also, a sleeve having a bore is provided that is disposed within the housing, the sleeve having a one end and a second end, the second end of the sleeve located by the one end of the second ring wherein the bores of the ring, the second ring and the sleeve are in substantial alignment relative to each another.

Other objects of the invention are achieved by providing a method for resisting rotational movement of can ends in a downstacker that comprises providing a ring with a bore adapted to provide an interference fit between the ring and the can ends, and restricting the rotational movement of the can ends in the bore of the ring by applying an interference fit between the ring and the can ends.

DETAILED DESCRIPTION OF PREFERRED EMBODIMENTS

Figure 1:
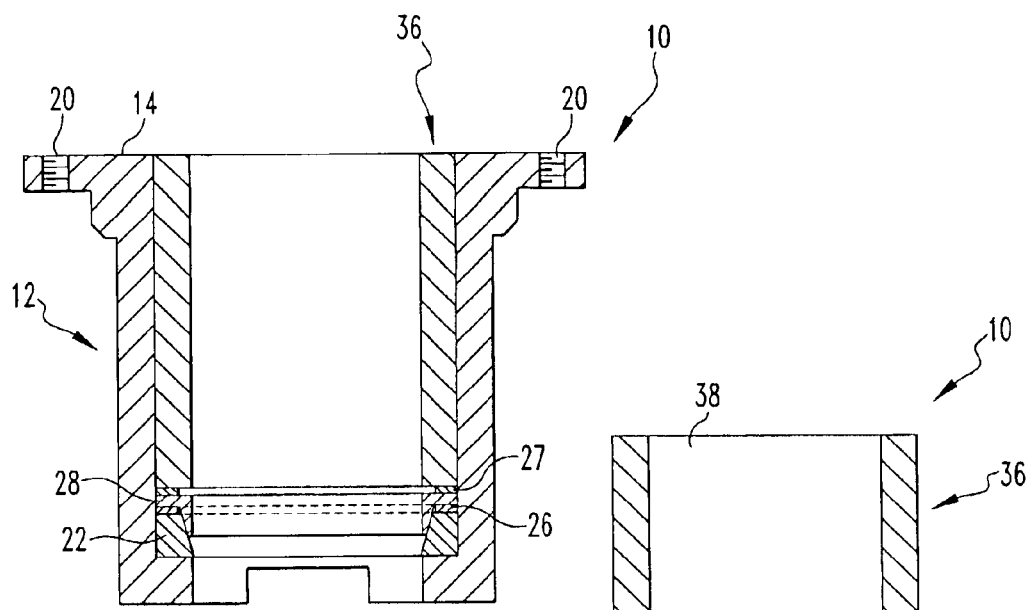
FIG. 1 is a cross sectional view of the first embodiment of the invention.
Figure 2:
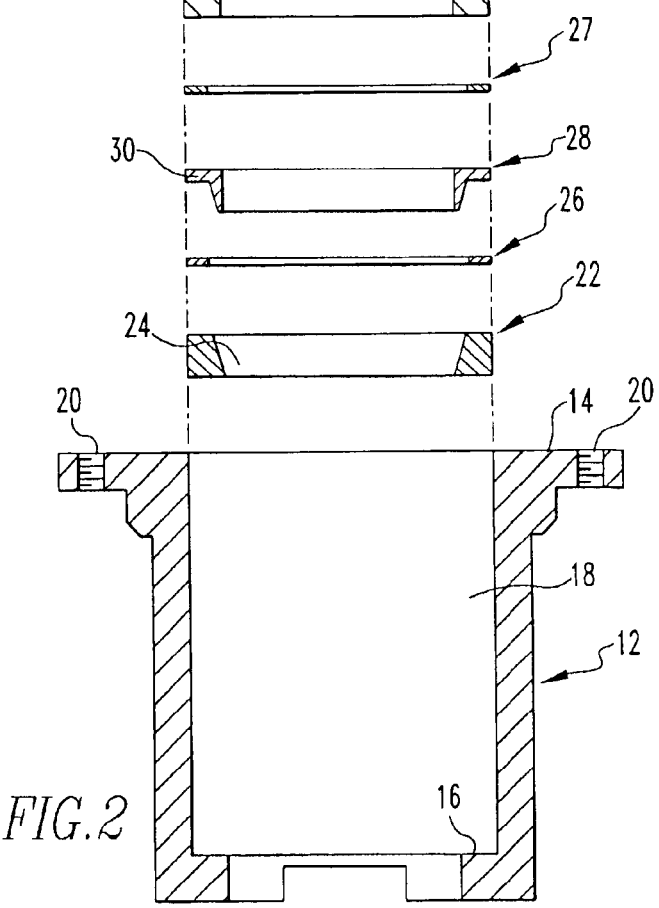
FIG. 2 is an exploded view in cross section of the first embodiment of the invention.
Figure 3:
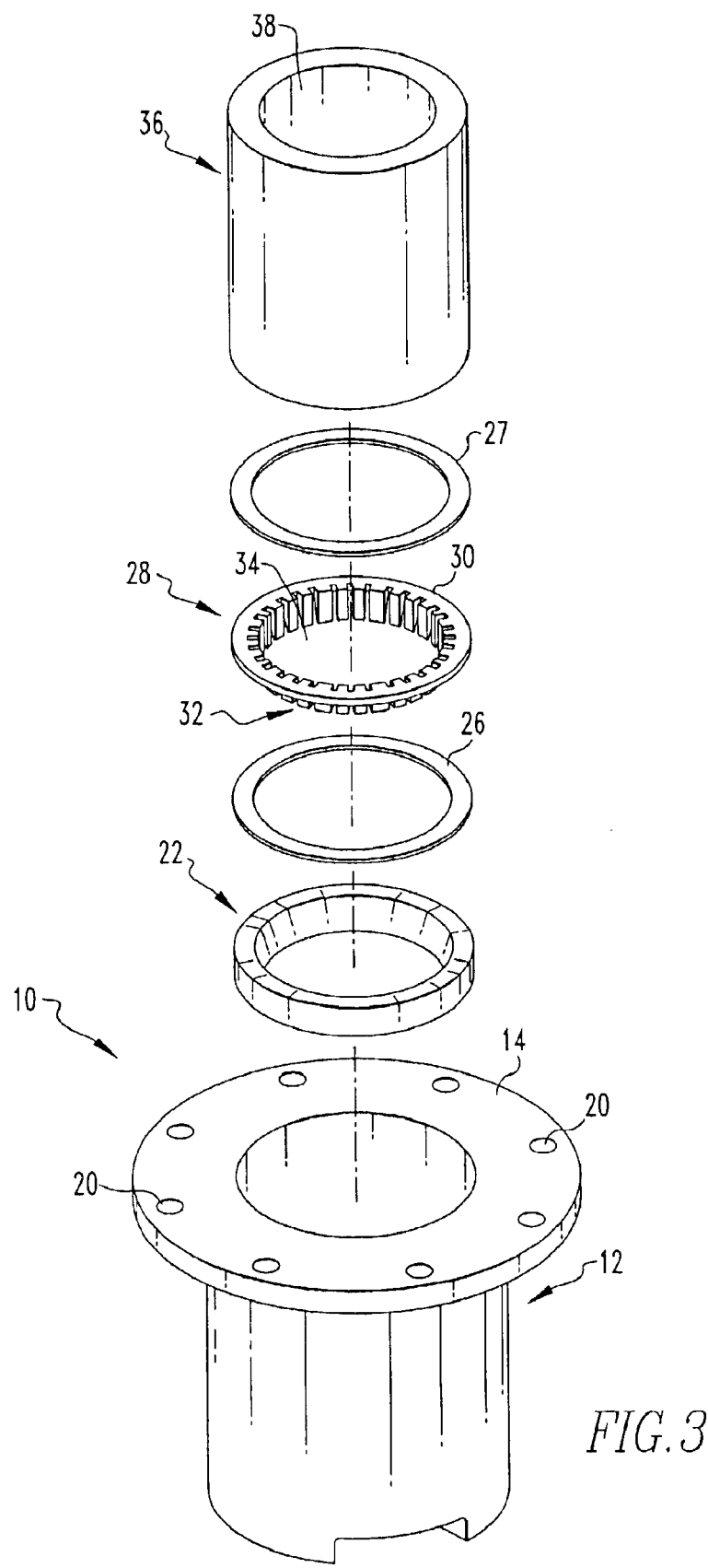
FIG. 3 is an exploded view of the first embodiment of the invention.

In FIGS. 1–3, the first embodiment of an apparatus 10 for resisting rotation of can ends in a downstacker is shown. The principal components of the apparatus are a generally T-shaped housing 12 that has a flange 14 at one end and a step 16 at a second end and a cylindrical bore 18 that extends through the housing 12 that is adapted to receive the remaining components of the apparatus 10.

Threaded bores 20 are disposed in the flange 14 that are adapted to receive throaded screws to secure the housing 12 to a conventional compound liner apparatus, conversion press, end seaming apparatus or offline test equipment. A ring 22 with a tapered bore 24 is slidably disposed within the housing 12. The ring 22 has one end that is flat and a second end that is flat that is located by the step 16 of the housing 12.

In certain embodiments, spacer rings 26 and 27 are disposed within the housing 12. Spacer rings 26 and 27 are commonly referred to in the industry as shims. The function of the spacer rings 26 and 27 is discussed below. A flexible ring 28 with a lip 30 at one end is disposed within the housing 12. The lip 30 of the ring 28 is located by the one end of the ring 22 or by the spacer ring 26 when a spacer ring 26 is disposed above ring 22. Preferably, as shown in FIG. 3, a plurality of flexible fingers 32 is provided along the entire circumference of the ring 28 as an integral component of the ring 28. A bore 34 of constant inner diameter extends through the flexible ring 28.

A cylindrical sleeve 36 with a smooth cylindrical bore 38 is slidably disposed within the housing 12. The sleeve 36 has a flat surface at one end and a second end of the sleeve 36. The second end of the sleeve 36 is located by the lip 30 of the ring 28 or by the spacer ring 27 when a spacer ring 27 is disposed above the ring 28.

Figure 5:
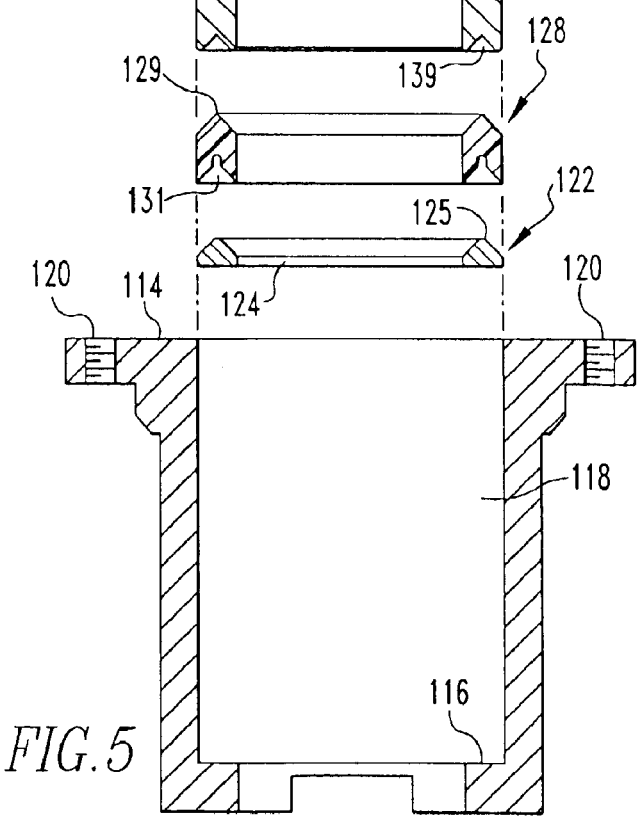
FIG. 5 is an exploded view in cross section of the second embodiment of the invention.

The apparatus 10 is inserted below a downstacker rod cage that holds a stack of can ends. The T-shaped housing 12 along with the other components of the present invention are affixed to a downstacker assembly in a manner that is well known in the art. An example of a T-shaped housing that is affixed to a downstacker assembly is shown in FIG. 5 of U.S. Pat. No. 4,262,629. Basically, the T-shaped housing is affixed to a compound liner apparatus, conversion press, end seaming apparatus or offline test equipment by threadedly engaging screws through threaded bores 20 in the flange 14 of the housing 12 and threaded bores located on the machines. Another feature of the apparatus 10 is that it is retrofitable to existing machines that are used in the industry.

In operation, with the components of the invention in an assembled relationship as shown in FIG. 1, a stack of can ends is disposed within the apparatus 10. Rotational movement of the can ends is restricted because the can ends have a slight interference fit with the bore 34 of the ring 28. Gravity or slight pressure applied to the stack of can ends urges the can ends through the bore 34 until the can end is expelled from the ring 28. In the preferred embodiment, gravity or slight pressure urges the can ends through the plurality of fingers 32 such that the fingers 32 extend outwardly until the can end is expelled from the ring 28 and is transferred to a compound liner apparatus, conversion press, end seaming apparatus or offline test equipment for further processing in a manner that is well known in the art. Rotational movement of the can ends can also be restricted by redesigning the separating knives, splitter knives or feed screws that are typically found in a conventional compound liner apparatus, conversion press, end seaming apparatus or offline test equipment. Such an approach would require the components not to all turn in the same direction. Modifying the rotation of these components would be more labor intensive and costly than the approach developed in the various embodiments of the present invention.

In certain embodiments, it has been found that one or more spacer rings 26 placed below the ring 28 raises the height of the ring 28 when it is disposed within the housing 12. Raising the height of the ring 28 assists the plurality of fingers 32 to extend outwardly when can ends are engaging the bore 34 of the ring 28. Also, in certain embodiments, one or more spacer rings 27 placed above the ring 28 raises the height of the sleeve 36 when it is disposed within the housing 12. Raising the height of the sleeve 36 ensures that the edge of the sleeve 36 is flush with the edge of the housing 12.

Figure 4:
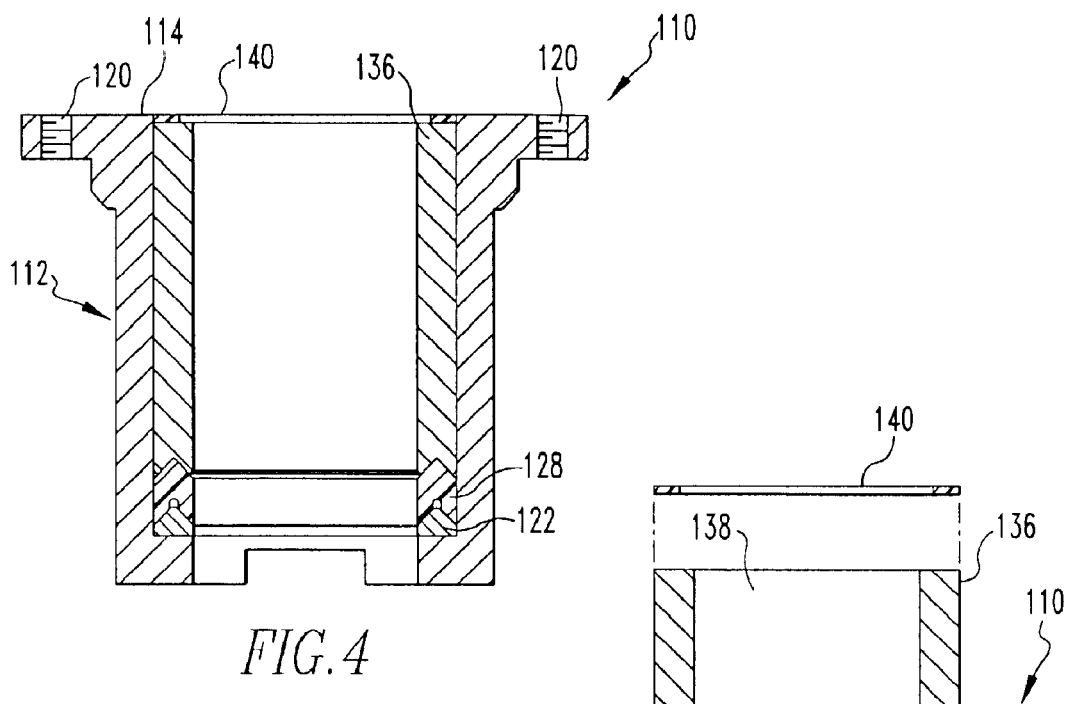
FIG. 4 is a cross sectional view of a second embodiment of the invention.
Figure 6:
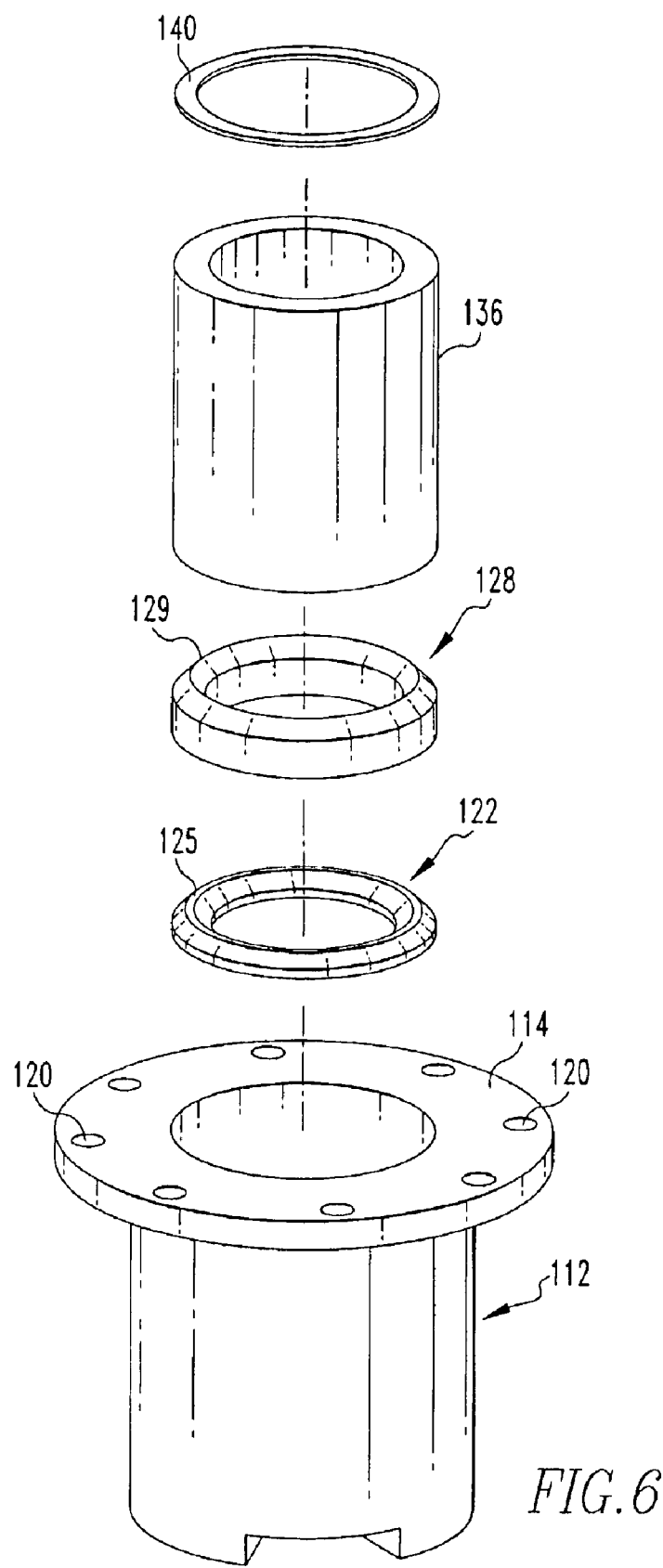
FIG. 6 is an exploded view of the second embodiment of the invention.

In FIGS. 4–6, the second embodiment of an apparatus 110 for resisting rotation of can ends in a downstacker is shown. The principal components of the apparatus 110 are a generally T-shaped housing 112 that has a flange 114 at one end and a step 116 at a second end and a cylindrical bore 118 that extends through the housing 112 that is adapted to receive the remaining components of the apparatus 110.

Threaded bores 120 are disposed in the flange 114 that are adapted to receive threaded screws to secure the housing 112 to a conventional compound liner apparatus, conversion press, end seaming apparatus or offline test equipment. A ring 122 with a bore 124 is slidably disposed within the housing 112. The ring 122 has a beveled edge 125 at one end of the ring 122 and has a flat portion on a second end of the ring 122. The second end of the ring 122 is located by the step 116 of the housing 112.

A flexible ring 128 is disposed within the housing 112 that has a beveled edge 129 at one end and has a recess 131 at a second end that is adapted to receive a beveled edge. The recess 131 engages the beveled edge 125 of the ring 122. A bore 134 extends through the flexible ring 128. In an alternate embodiment, a plurality of fingers can be provided along the entire length of the ring 128 as an integral component of the ring 128 in the manner shown in the embodiment of FIG. 3.

A cylindrical sleeve 136 with a smooth cylindrical bore 138 is slidably disposed within the housing 112. The sleeve 136 has a flat surface at one end and a recess 139 at a second end of the sleeve 136 that is adapted to receive a beveled edge. The recess 139 of the sleeve 136 engages the beveled edge 129 of the ring 128.

The apparatus 110 is inserted below a downstacker rod cage in the same manner as described above for the embodiments of FIGS. 1–3. For the sake of being concise, that description will not be repeated. The apparatus 110 is retrofitable to existing machines that are used in the industry. In operation, with the components of the invention in an assembled relationship as shown in FIG. 4, a stack of can ends is disposed within the apparatus 110. Rotational movement of the can ends is restricted because the can ends have a slight interference fit with the bore 134 of the ring 128. Gravity or slight pressure urges the can ends through the bore 134 until the can end is expelled from the ring 128 and is transferred to a compound liner apparatus, conversion press, end seaming apparatus or offline test equipment for further processing in a manner that is well known in the art. In an alternate embodiment, gravity or slight pressure urges the can ends through the plurality of fingers provided along the entire length of the ring 128 such that the fingers extend outwardly until the can end is expelled from the ring 28 for further processing.

In certain embodiments, it has been found that one or more spacer rings 140 placed above the sleeve 136 increases the height of the sleeve 136 to ensure that the edge of the sleeve 136 is flush with the edge of the housing 112. Spacer rings 140 are commonly referred to in the industry as shims.

In the embodiments disclosed in FIGS. 1–6, the housings 12 and 112, the rings 22 and 122, and the sleeves 36 and 136 were manufactured from aluminum alloy. Alternatively, the housings 12 and 112, the rings 22 and 122, and the sleeves 36 and 136 could be manufactured from steel alloys, other metallic alloys, thermoplastic materials or urethanes as well. Also, it has been found to be an ergonomic improvement to manufacture such components from lighter weight aluminum alloys, thermoplastic materials or urethanes because the lighter weight components reduce strain to an end user inserting the apparatus 10 and 110 under a rod cage in a downstacker. In the embodiments disclosed in FIGS. 1–6, the rings 28 and 128 were manufactured from urethane. Alternatively, the rings 28 and 128 could be manufactured from other suitable thermoplastic materials as well.

While the embodiments disclosed in FIGS. 1–6 have been designed to restrict the rotation of can ends in a downstacker used in the manufacture of beer, beverage or food containers, the invention would be equally applicable to the manufacture of any can end. Also, while the embodiments disclosed in FIGS. 1–6 have been designed to restrict the rotation of can ends made from aluminum alloy, the invention would be equally applicable to restrict the rotation of can ends made from steel alloy or other metallic alloys as well. Additionally, while the embodiments disclosed in FIGS. 1–6 have been designed to restrict the rotation of 202 diameter can ends, the invention would be equally applicable to other diameter can ends as well. The number 202 refers to a industry standard designation. A 202 diameter can end is equivalent to a 2 and 2/16 inch diameter after the can end is seamed onto a can body. A 204 diameter can end would be equivalent to a 2 and 4/16 inch diameter after the can end is seamed onto a can body. These dimensions are nominal and not precise measurements.

In FIGS. 1–6, the rings 28 and 128 all provide a contacting force or interference fit with the can ends to restrict the rotational movement of the can ends. The contacting force or interference fit with the can ends may be relatively small when gravity provides the urging force on the stack of can ends. Alternatively, the contacting force or interference fit with the can ends can be significantly greater when the urging force is applied to the stack of can ends by a mechanical pusher device.

Having described the presently preferred embodiments of the invention, it is to be understood that the invention may be otherwise embodied within various functional equivalents disclosed within the scope of the appended claims.

What is claimed is:

1. An apparatus for resisting rotational movement of can ends in a downstacker, the apparatus comprising:
    (a) a housing having a bore for receiving the can ends with a flange at one end of the housing and a step at a second end of the housing;
    (b) a ring having a bore that is disposed within the housing, the ring having a one end and a second end, the second end of the ring located adjacent the step of the housing;
    (c) a second ring having a bore that is disposed within the housing, the second ring having a one end and a second end, either the one end or the second end of the second ring is located adjacent the one end of the ring; and
    (d) a sleeve having a bore that is disposed within the housing, the sleeve having a one end and a second end, the second end of the sleeve located adjacent the one end of the second ring wherein the bores of the ring, the second ring and the sleeve are in substantial alignment relative to each other.

2. The apparatus of claim 1 wherein the bore of the ring is tapered.

3. The apparatus of claim 1 wherein a plurality of flexible fingers is provided as an integral component of the second ring.

4. The apparatus of claim 1 wherein the one end of the ring has a beveled edge and the second end of the ring has a flat surface.

5. The apparatus of claim 1 wherein the one end of the second ring has a beveled edge, the second end of the second ring has a recessed portion adapted to receive a beveled edge and a plurality of flexible fingers is provided as an integral component of the second ring.

6. The apparatus of claim 1 wherein the second end of the sleeve has a recessed portion adapted to receive a beveled edge.

7. The apparatus of claim 1 further comprising at least one spacer ring disposed within the housing, the at least one spacer ring having a bore and the at least one spacer ring is located above the sleeve wherein the bore of the at least one spacer ring is in substantial alignment with the bores of the ring, tho second ring and the sleeve.

8. The apparatus of claim 1 wherein the one end of the ring has a beveled edge, the one end of the second ring has a beveled edge and the second end of the second ring has a recessed portion adapted to receive a beveled edge, the second end of the sleeve has a recessed portion adapted to receive a beveled edge, the beveled edge of the ring disposed within the recessed portion of the second ring and the beveled edge of the second ring disposed within the recessed portion of the sleeve.

9. The apparatus of claim 1 wherein the can ends are made of aluminum alloys, steel alloys or other metallic alloys.

10. The apparatus of claim 1 further comprising a plurality of spacer rings disposed within the housing, each of the plurality of spacer rings having bores, at least one spacer ring that located above and below the second ring wherein the bores of the spacer rings are in substantial alignment with the bores of the ring, the second ring and the sleeve.

11. The apparatus of claim 10 wherein the bore of the ring is tapered, a plurality of flexible fingers is provided as an integral component of the second ring arid the one end of the second ring has a lip that is located in between the spacer rings.

12. The apparatus of claim 1 wherein the flange has one or more threaded bores disposed in the flange that are adapted to receive one or more threaded screws.

13. The apparatus of claim 12 further comprising a machine that is affixed to the flange of the housing with threaded screws.

14. The apparatus of claim 13 wherein the machine is selected from the group consisting of a compound liner, a conversion press, a can end seaming apparatus and an offline test apparatus.

15. A method for resisting rotational movement of can ends in a downstacker, the method comprising:
    (a) providing a ring with a bore adapted to provide an interference fit between the ring and the can ends; and
    (b) restricting the rotational movement of the can ends in the bore of the ring by applying an interference fit between the ring and the can ends,
    (c) wherein a plurality of flexible fingers is provided as an integral component of the ring.

16. The method of claim 15 further comprising urging the can ends through the bore of the ring.

17. A method for resisting rotational movement of can ends in a downstacker using an apparatus comprising a housing having a bore with a flange at one end of the housing and a step at a second cad of the housing, a ring having a bore that is disposed within the housing, the ring having one end and a second end, the second end of the ring located adjacent the step of the housing, a second ring having a bore that is disposed within the housing, the second ring having one end and a second end, either the one end or the second end of the second ring is located adjacent the one end of the ring, and a sleeve that is disposed within the housing, the sleeve having one end, a second end and a bore, the second end of the sleeve located adjacent the one end of the second ring wherein the bores of the ring, the second ring and the sleeve are in substantial alignment relative to each other, the method comprising restricting rotation of the van ends in the second ring with an interference fit provided between the second ring and the can ends.

18. The method of claim 17 wherein a plurality of flexible fingers is provided as an integral component of the second ring.

19. The method of claim 17 further comprising urging the can ends through the bore of the second ring.

* * * * *